W. H. MORGAN.
PLANT FOR THE MANUFACTURE OF MACHINERY AND OTHER APPARATUS.
APPLICATION FILED JUNE 17, 1919.
1,333,992.
Patented Mar. 16, 1920.
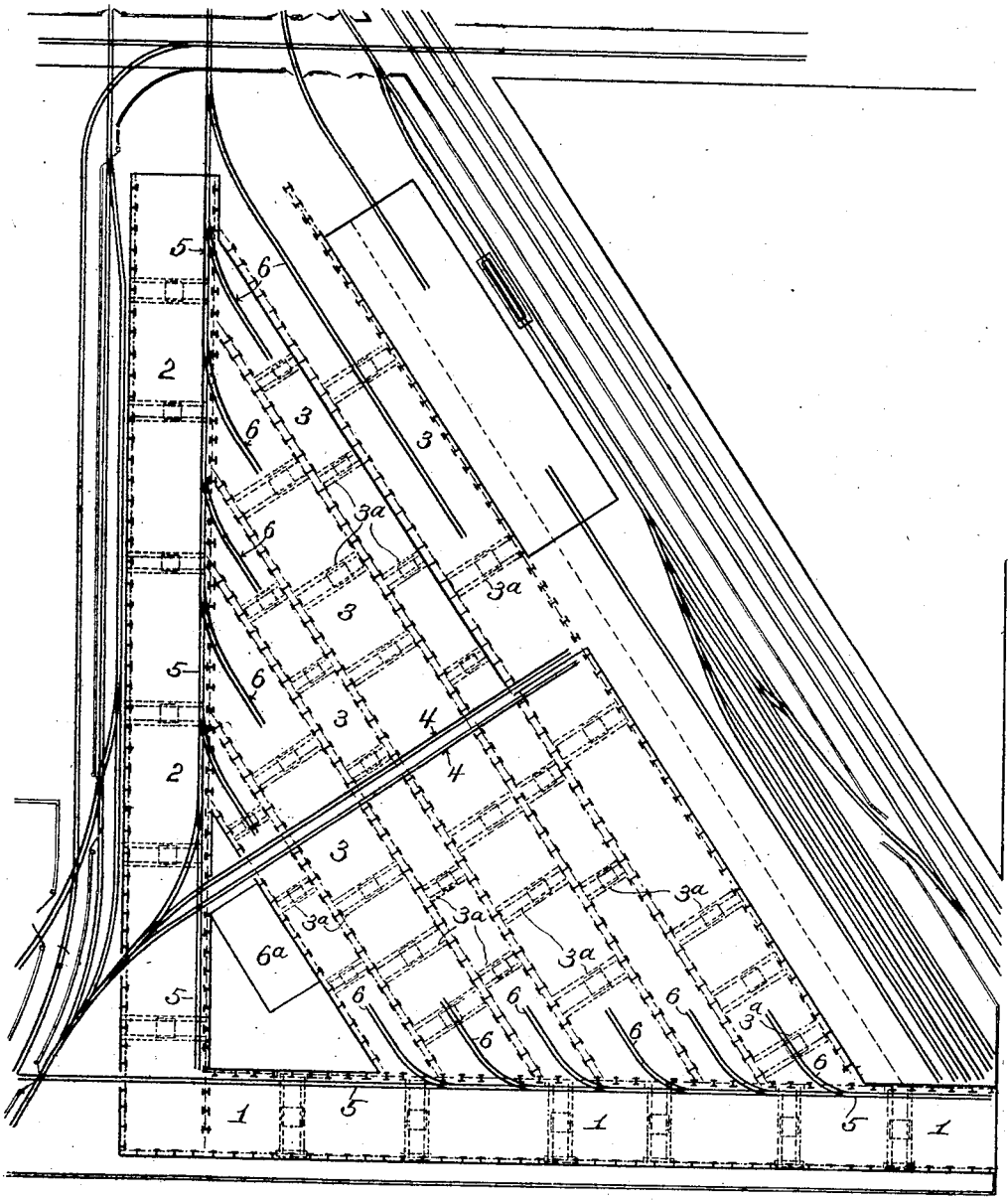

UNITED STATES PATENT OFFICE.

WILLIAM HENRY MORGAN, OF ALLIANCE, OHIO, ASSIGNOR TO THE MORGAN ENGINEERING COMPANY, OF ALLIANCE, OHIO.

PLANT FOR THE MANUFACTURE OF MACHINERY AND OTHER APPARATUS.

1,333,992.

Specification of Letters Patent.

Patented Mar. 16, 1920.

Application filed June 17, 1919. Serial No. 304,961.

*To all whom it may concern:*

Be it known that I, WILLIAM HENRY MORGAN, a citizen of the United States, and a resident of Alliance, in the county of Stark and State of Ohio, have invented certain new and useful Improvements in Plants for the Manufacture of Machinery and Other Apparatus; and I do hereby declare the following to be a full, clear, and exact description of the invention, such as will enable others skilled in the art to which it appertains to make and use the same.

My invention relates to an improvement in plants for the manufacture of machinery and other apparatus, the object being to provide an arrangement whereby the handling of raw material and work in course of construction and the completed work are reduced to a minimum and carried on without interfering with other work under construction in the same plant, and it consists in the combination and arrangement of parts as will be more fully explained and pointed out in the claims.

The accompanying drawing is a view in plan of my improved plant.

1 and 2 represent the main or assembling shops located at right angles to each other and connected at one end. The space intermediate the two side or erecting shops 1 and 2 is housed over forming one structure in the shape of a right angle triangle, and the space intermediate the two shops is divided into shops or bays 3 extending from one side shop to the other and in open communication at their ends with both.

The bays 3 are equipped with machines for the manufacture of the parts of the work under construction and with overhead cranes 3ª for moving the material and work from a surface car to a machine in the bay or vice versa, or to another machine in the same bay. I prefer to locate the machines for light work intermediate two bays equipped with machines for heavy work.

One or more surface tracks 4 leading from a track outside of the shops, pass transversely through the bays, and also through one of the assembling shops in the event the rail road should be on that side of the structure, for delivering the raw material, castings, or other parts of the work, to the particular bay in which it is to be worked. This track 4 is preferably at or near the center of the length of the bays, and the material or work on the cars is taken from the latter by overhead cranes 3ª and delivered direct to the machine for which it is intended.

Each side or erecting shop 1 and 2 has a surface track 5 extending lengthwise the same adjacent the inner side of the shop, and spur tracks 6 lead from these tracks into the several bays at the ends of the latter sufficiently far for a crane 3ª in the bay to cover the car for loading the work thereon. After the parts have been finished in the bays they are transported by cranes and cars into one of the erecting shops at the end of the bay where the parts are assembled after which they are loaded onto surface cars which are moved out onto the tracks in the yard ready for transportation to its destination.

By locating the tracks 5 in the erecting shops adjacent the inner side walls of the latter, clear floor space at the outer sides of the tracks is left for erecting purposes, and by locating the bays obliquely to the erecting shops, the spur tracks in the bays can connect directly with the tracks 5 in the erecting shops without employing turn-tables which are necessary in shops which are at right angles to each other.

With this arrangement ample space is provided within the vertex or angle at the juncture of the two erecting shops, for the power plant 6ª for supplying motive power to all machines and apparatus in the erecting shops and bays.

Having fully described my invention what I claim as new and desire to secure by Letters-Patent, is:

1. In a machine shop plant, an erecting shop, a plurality of bays each communicating at one end with said shop and all located obliquely to the latter, a surface track within the erecting shop having spurs leading into the adjacent ends of the several bays, and overhead cranes in the bays for loading the work onto the cars on said spur tracks.

2. In a machine shop plant, an erecting shop, a plurality of bays each communicating at one end with said shop and all located obliquely to the latter, a surface track passing transversely through the bays and adjacent the center of the latter, a surface track in the erecting shop, spurs leading from said latter track into the bays, and overhead cranes in the bays for loading the work onto cars on said spur tracks.

3. In a machine shop plant, two shops located to form a triangular space between them, bays connecting the two shops and oblique to both, surface tracks in the shops, spur tracks leading from said surface tracks into the bays at both ends of the latter, and overhead cranes in the bays for loading the work onto cars on the spur tracks.

4. In a machine shop plant, two shops located to form a triangular space between them, bays connecting two shops and oblique to both, surface tracks in the shops and adjacent to the inner side walls of the latter, and spur tracks leading from the said surface tracks into both ends of the bays for loading the work onto cars on the spur tracks.

In testimony whereof I have signed this specification in the presence of two subscribing witnesses.

WILLIAM HENRY MORGAN.

Witnesses:
N. C. FETTERS,
M. C. WISMER.